United States Patent [19]

Roemer et al.

[11] Patent Number: 4,693,617
[45] Date of Patent: Sep. 15, 1987

[54] PLAIN JOURNAL BEARING

[75] Inventors: Erich Roemer; Eckhart Schopf; Günter Cezane, all of Wiesbaden, Fed. Rep. of Germany

[73] Assignee: Glyco-Metall-Werke Daelen & Loos GmbH, Wiesbaden, Fed. Rep. of Germany

[21] Appl. No.: 885,080

[22] Filed: Jul. 14, 1986

Related U.S. Application Data

[63] Continuation-in-part of Ser. No. 634,691, Jul. 26, 1984, abandoned.

[30] Foreign Application Priority Data

Aug. 6, 1983 [DE] Fed. Rep. of Germany ....... 3328509

[51] Int. Cl.$^4$ .................. F16C 33/04; F16C 33/10
[52] U.S. Cl. ................................ 384/282; 384/286; 384/397
[58] Field of Search ............... 384/373, 399, 283, 286, 384/291, 292, 397, 378, 398, 369, 222, 99, 288, 282

[56] References Cited

U.S. PATENT DOCUMENTS

| | | | |
|---|---|---|---|
| 769,432 | 9/1904 | Chinn | 384/286 |
| 1,689,319 | 10/1928 | Bonner | 384/378 X |
| 2,576,141 | 11/1951 | Pike | 384/222 |
| 2,905,511 | 9/1959 | Cerness | 384/295 X |
| 3,399,000 | 8/1968 | Reimers | 384/99 |
| 4,333,688 | 6/1982 | Spargo et al. | 384/286 |
| 4,383,719 | 5/1983 | Matzelle | 384/282 |
| 4,459,048 | 7/1984 | Stachuletz | 384/291 |

FOREIGN PATENT DOCUMENTS

| | | |
|---|---|---|
| 546781 | 3/1932 | Fed. Rep. of Germany . |
| 460018 | 1/1937 | United Kingdom ............... 384/397 |
| 538773 | 8/1941 | United Kingdom . |
| 680478 | 4/1950 | United Kingdom . |
| 653708 | 5/1951 | United Kingdom . |
| 713562 | 8/1954 | United Kingdom . |
| 812161 | 4/1959 | United Kingdom . |
| 970392 | 9/1964 | United Kingdom . |
| 1102969 | 2/1968 | United Kingdom . |
| 1103714 | 2/1968 | United Kingdom . |
| 1590596 | 8/1977 | United Kingdom . |
| 582419 | 11/1977 | U.S.S.R. ........................... 384/286 |

OTHER PUBLICATIONS

Tribologie—Schadenverhutung—Reibkorrosion ein besonderes Verschleissproblem by Peter Weismann (1982) pp. 44–48.
International Standard Norme Internationale ISO 4378/1-1-1983 (E/F/R) Plain Bearings—Terms, Definitions and Classification—Part 1 . . . (21 pages).

Primary Examiner—Stuart S. Levy
Assistant Examiner—Lynn M. Sohacki
Attorney, Agent, or Firm—Karl F. Ross; Herbert Dubno

[57] ABSTRACT

A slider bearing assembly has a bearing housing having a bore centered on an axis and having an inside bore surface and a uniform composition plain bearing liner in and coaxial with the bore and having an outer surface delimited by two axially oppositely directed end faces, an axial middle region between the end faces, and an inner surface centered on the axis. The bore and outer surfaces are in mutual surface contact in a contact area and normally directly engage each other without the interposition of a liquid lubricant. The bearing liner is fixed in the housing against any movement relative thereto other than micromovements. A movable part has a journal centered on the axis and radially outwardly confronting and normally engaging the inner liner surface. This movable part is nonradially movable relative to the liner and housing, that is it can only move axially and/or angularly relative to the liner. Drainage channels formed in at least one of the surfaces at the contact area extend to the axial end faces. The liner is of uniform radial thickness at least between the channels. Lubricant is withdrawn from the channels to maintain the contact area substantially dry.

10 Claims, 12 Drawing Figures

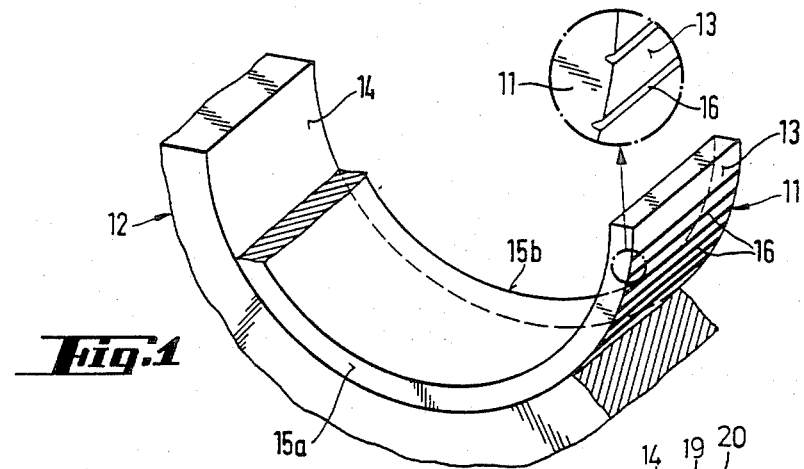
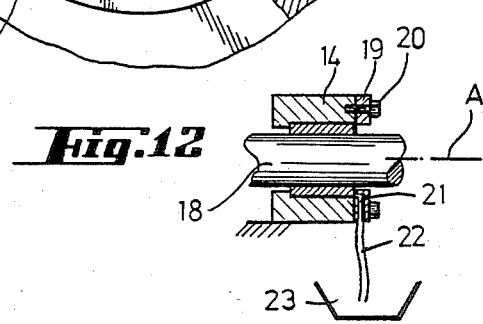
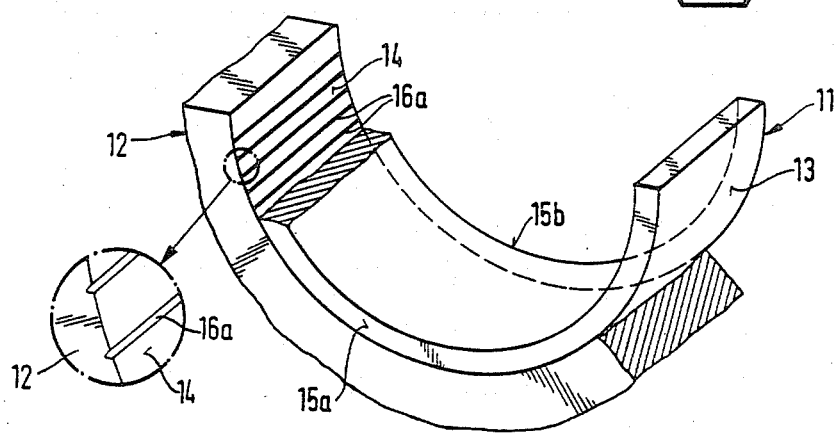

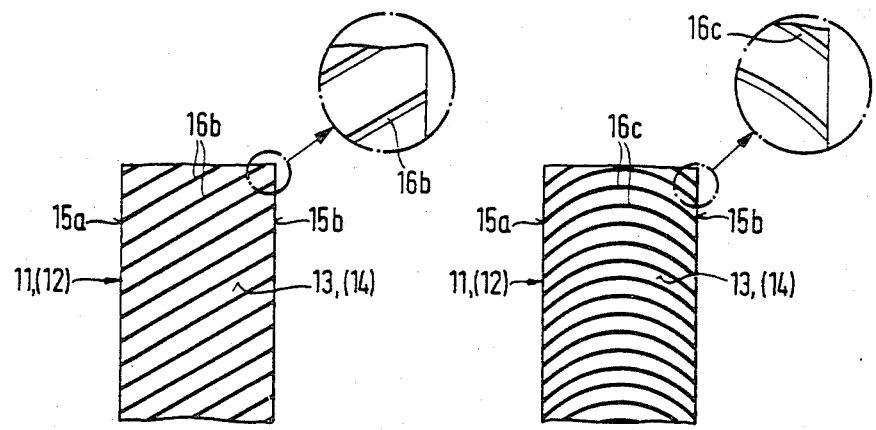
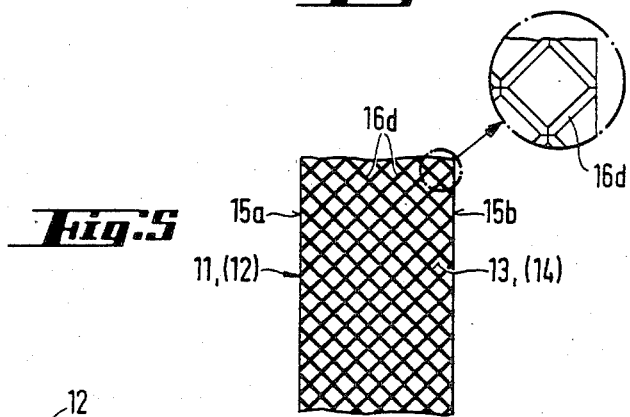
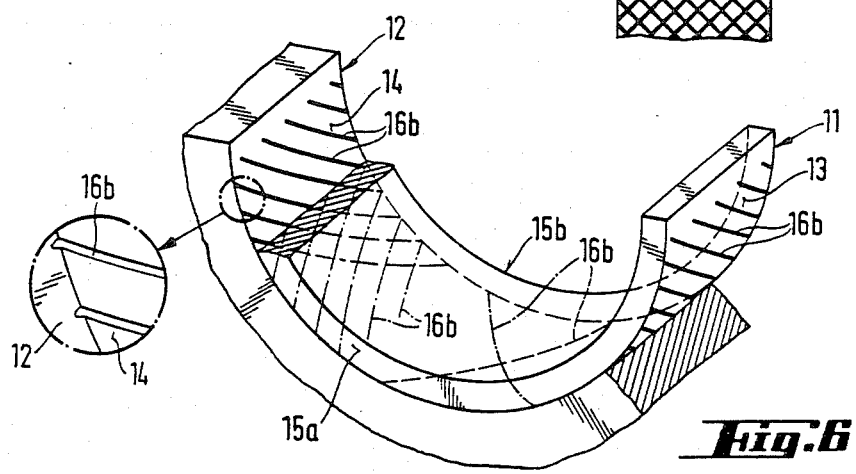

PLAIN JOURNAL BEARING

CROSS REFERENCE TO RELATED APPLICATION

This application is a continuation in part of copending patent application 634,691 filed July 26, 1984 now abandoned.

FIELD OF THE INVENTION

The present invention relates to a plain journal bearing. More particularly this invention concerns such a bearing used, for instance, on a connecting rod of an internal-combustion engine.

BACKGROUND OF THE INVENTION

A plain journal bearing assembly, as defined in International Standard 4378/1-1983, has a plain bearing liner or insert which is formed as a cylindrical sleeve, typically of two identical halves and normally having cylindrical and coaxial inner and outer surfaces and axially oppositely directed end faces. This liner is received radially between a bearing housing having an inside surface against which lies the outer surface of the journal and a movable part having an outside surface or journal against which lies the inner surface of the liner. The liner is clamped so that it is substantially nonmovable on the housing part and so that substantially all of the relative sliding movement in the bearing takes place at the normally cylindrical interface between the inner liner surface and the journal. A classic use of such a plain journal bearing assembly is between a journal formed on a crankshaft and a connecting rod leading to a piston of an internal combustion engine, in which case the crankshaft is the movable inside part and the housing is formed by the connecting rod and all relative movement is angular.

The fit of the outer liner surface and the inside housing surface is invariably very tight so that the liner is held as solidly as possible. On the other hand at least microscopic play is always left between the inner liner surface and the journal so that same can move angularly and/or axially in the liner while being prevented from moving radially relative to the liner or housing.

It is possible to lubricate the inner liner surface in order to facilitate sliding although not strictly necessary to do so, so that some of the liquid lubricant can work its way into the contact area between the outer liner surface and the inside housing surface. Even in a normally unlubricated bearing, lubricants from other parts or other liquids and even solids frequently get into the liner/housing contact area.

The reason such deposits can get into this contact area is that, no matter how tightly the liner is secured in the housing and no matter how good the liner/housing fit is, so-called micromovements cannot be eliminated. Such movements can be caused by the tiny differences in coefficients of thermal expansion between the invariably different materials constituting the housing and liner, and from the inevitable tiny elastic deformation of the liner during use.

In U.S. Pat. No. 4,383,719 of Matzelle a solution to this buildup between the normally nonmoving contact area between a liner and a housing is proposed. The outer surface of the liner is made barrel-shaped, that is like a truncated ellipsoid. The result is that the micromovements squeeze any lubricant that gets into the housing/liner contact area outward, thereby keeping this contact area fairly clean. Unfortunately this squeezing action is not effective for hardened or caked on material. In addition machining the requires surface into the liner is somewhat complex and expensive.

As a result the standard solution to this problem has always been simply to fix the liner as solidly as possible in the housing. This can be done by the use of massive clamping rings and by making the liner as massive as possible. Either solution substantially increases the bulk and weight of the bearing assembly and therefore is not suitable for today's lightweight construction.

OBJECTS OF THE INVENTION

It is therefore an object of the present invention to provide an improved plain bearing assembly.

Another object is the provision of such a plain bearing assembly which overcomes the above-given disadvantages, that is which does not allow oil oxides and the like to deposit and build up in the contact area between the normally relatively nonmoving liner and housing.

SUMMARY OF THE INVENTION

A slider bearing assembly according to the invention has a bearing housing having a bore centered on an axis and having an inside bore surface and a uniform composition plain bearing liner in and coaxial with the bore and having an outer surface delimited by two axially oppositely directed end faces, an axial middle region between the end faces, and an inner surface centered on the axis. The bore and outer surfaces are in mutual surface contact in a contact area and normally directly engage each other without the interposition of a liquid lubricant. The bearing liner is fixed in the housing against any movement relative thereto other than micromovements. A movable part has a journal centered on the axis and radially outwardly confronting and normally engaging the inner liner surface. This movable part is nonradially movable relative to the liner and housing, that is it can only move axially and/or angularly relative to the liner. Drainage channels formed in at least one of the surfaces at the contact area extend to the axial end faces. The liner is of uniform radial thickness at least between the channels. Lubricant is withdrawn from the channels to maintain the contact area substantially dry.

The invention is based on the recognition that in operation of a slider bearing assembly according to the invention the above-described micromovements, which cannot be suppressed completely, are used to scrape any lubricant getting into the contact area by means of these channels, which typically have sharp edges. The scraped up lubricant can then flow out of the channels at the end faces, where it will not do any harm.

The instant invention is therefore distinguished from that of U.S. Pat. No. 769,432 of Chinn where a moving contact area or interface is fed lubricant through channels, but where the normally nonmoving interface was neither provided with channels nor drained. Similarly, in the arrangement of U.S. Pat. No. 2,905,511 depressions or outwardly open concavities were provided on the outer surface of the liner, at the nonmoving interface, but such formations could not collect or drain, so they did not work like the system of this invention. Forming grooves open at the ends and forcing a coolant through them, as in U.S. Pat. No. 2,576,141 also does not produce the same result as the instant invention since such coolant normally has a lubricant function and it being under pressure does not let the channels act much like drains.

In order to avoid weakening the element the channels are cut into the channels are very fine. A considerable reduction in cross section is possible since these channels serve merely to carry off the microscopic amounts of material that work their way into the liner/housing interface. Thus according to this invention the area occupied by the drainage channels is at the most 15% of the contact area, the radial depth of the drainage channels is 0.03 mm to 0.2 mm and 2% to 5% of the radial thickness of the plain bearing liner and this radial thickness is equal to $>/=4$ mm. This fineness clearly distinguishes the channels of the instant invention from standard coolant or lubricant passages.

The channels according to this invention can have many forms. In the simplest case they extend continuously between the end faces, typically straight and parallel to the axis. In addition the channels can be axially open only at the end faces and the middle region can be smooth and unchanneled. The channels can extend obliquely nonparallel to the axis or can be arcuate. In addition some of the channels can extend obliquely between the end faces in one direction and the other channels in a crossing direction so that the channels cross and intersect. This effect can also be achieved when one of the bore and outer surfaces is formed with such channels that extend obliquely all generally parallel to one another and the other of the bore and outer surfaces is also formed with such channels that also extend obliquely all generally parallel to one another but opposite to the channels of the one surface. Thus the channels of the one surface cross those of the other. It is also possible for the channels to flare axially toward the end faces. In this last case they are of constant radial depth and flare only angularly.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIGS. 1 and 2 are perspective views of bearing arrangements according to the invention with the bearing element and bearing housing broken away;

FIGS. 3, 4, and 5 are plan views of different drainage grooves or channels according to this invention, the views being developed in a plane;

FIG. 6 is a view like FIGS. 1 and 2 of another bearing in accordance with this invention;

FIG. 12 is a small-scale and mainly diagrammatic view of the system of FIG. 1.

SPECIFIC DESCRIPTION

Figure 7:
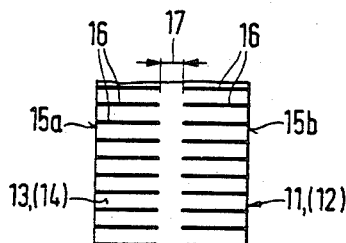
FIGS. 7, 8, 9, and 10 are plan views like FIGS. 3–5 of different drainage-canal configurations in accordance with the invention.

As seen in FIGS. 1 and 12 a plain bearing assembly basically comprises a bearing housing 12 having a bore centered on an axis A and having a bore surface 14. A uniform composition plain bearing liner 11 in and coaxial with the bore has an outer surface 13 delimited by two axially oppositely directed end faces 15a and 15b and an axial middle region (17 in FIGS. 7 through 11) between the end faces 15a and 15b. The surfaces 13 and 14 are in mutual surface contact in a contact area and normally directly engage each other without the interposition of a liquid lubricant. Drainage channels 16 are formed in the surface 13 to carry off any lubricant that gets into this interface. The liner 11 is of uniform radial thickness at least between the channels 16 and the channels 16 extend to the axial end faces 15a and 15b. In addition the area occupied by the drainage channels 16 is at most 15% of the contact area, the radial depth of the drainage channels 16 is 0.03 mm to 0.2 mm (preferably between 0.05 mm and 0.1 mm) and 2% to 5% of the radial thickness of the plain bearing liner 11, and this radial thickness is at least equal to 4 mm. Means in the form of an end ring 19 and bolts 20 is provided for fixing the bearing liner 11 in the housing 12 against any movement relative thereto other than micromovements. Furthermore, means in the form of a radial drain passage 21 extending down through the housing 12 and connected via a conduit 22 to a sump 23 is provided for withdrawing lubricant from the channels 16 and thereby maintaining the surfaces 13 and 14 substantially dry.

In FIG. 1 the drainage channels 16 extend from one axial end face 15a to the other face 15b, that is they extend continuously the full axial length of the liner 11. The channels 16 are parallel to the axis A.

In the embodiment of FIG. 2 the bearing liner 11 has, as is conventional, a smooth outer surface 13. Drainage channels 16a are formed in the inner surface 14 of the housing 12. These channels 16a extend axially the full axial length of the liner 11. In such an arrangement the channels 16a can be somewhat deeper than in that of FIGS. 1 and 12 since the housing 12 is not as thin radially as the liner 11 and therefore will not be excessively weakened thereby.

FIG. 3 shows a modification wherein drainage channels 16b are shown which extend between the faces 15a and 15b, but not parallel to the axis A. Instead they run obliquely as seen in plan, that is each channel 16b lies on a respective helix centered on the axis. Such channels 16b can be cut into the housing surface 14 or liner surface 13.

FIG. 4 shows another arrangement wherein arcuate channels 16c are provided, once again extending axially from end face 15a to end face 15b and cut either into the surface 13 or 14. Each such channel 16c has its opposite ends axially aligned.

In FIG. 5 the surface 13 or 14 is formed with a crisscross hatching of channels 16c between the faces 15a and 15b. The two sets of parallel such channels 16d intersect at 90°.

The arrangement of FIG. 6 achieves the same effect as that of FIG. 5, by forming both surfaces 13 and 14 with oblique channels 16b as in FIG. 3, but with the angles opposite so that the channels 16b of the surface 13 perpendicularly intersect the channels 16b of the surface 14.

As seen in FIG. 7, in order to avoid weakening of the bearing assembly at a critical central region 17 of the surface 13 or 14 equispaced between the end faces 15a and 15b, the channels 16 can terminate axially at the edge of this region 17, leaving this part of the surface 13 or 14 smooth and interrupted. Thus each channel 16 has an outer end opening at the respective end face 15a or 15b and an opposite blind end at the outer boundary of the central region 17.

Figure 8:
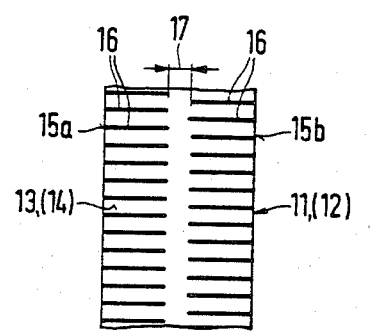
Figure 9:
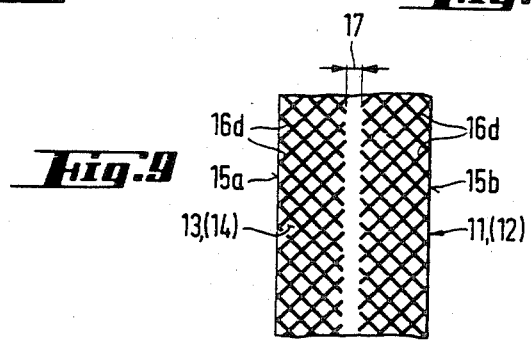

FIG. 8 shows how the channels 16 of the one axial end face 15a can be offset angularly from, that is staggered relative to the channels 16 of the other face 15b. Similarly in FIG. 9 crisscross channels 16d like in FIG. 5 are shown to opposite sides of the uninterrupted central region 17.

Figure 10:
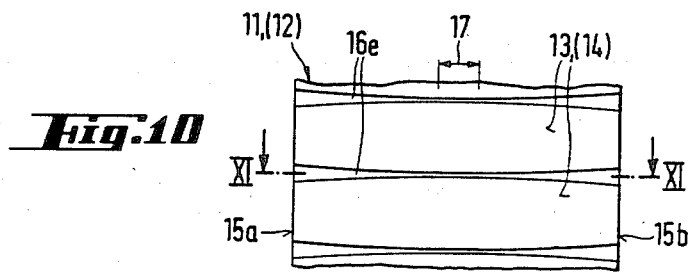
Figure 11:
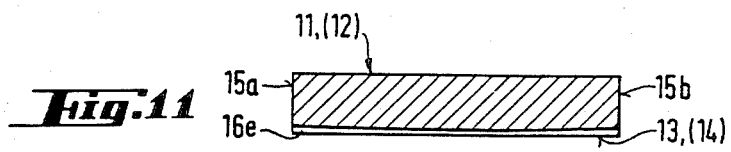
FIG. 11 is a section taken along line XI—XI of FIG. 10.

Finally FIGS. 10 and 11 show axially extending channels 16e which flare centrally outward, that is they are of relatively small cross section at the central region 17 and relatively great section at their outer ends at the faces 15a and 15b. This is achieved by flaring the channels 16e only angularly so that their radial depth remains constant as seen in FIG. 11.

The instant invention can be applied to other types of bearings. For instance drainage channels could be cut in axial faces of thrust bearings, so long as this was done at a contact area where relative movement is normally inhibited, except of course for the unavoidable micromovements.

We claim:

1. A slider bearing assembly comprising:
    a bearing housing having a bore centered on an axis and having a bore surface;
    a uniform composition plain bearing liner in and coaxial with the bore and having an outer surface delimited by two axially oppositely directed end faces and an axial middle region between the end faces and an inner surface, the bore and outer surfaces being in mutual surface contact in a contact area and normally directly engaging each other without the interposition of a liquid lubricant;
    means for fixing the bearing liner in the housing against any movement relative thereto other than micromovements;
    a movable part having a journal radially outwardly confronting and normally engaging the inner liner surface, the movable part being nonradially movable relative to the liner and housing;
    drainage channels formed in at least one of the bore and outer surfaces at the contact area and extending to the axial end faces, the liner being of uniform radial thickness at least between the channels, the area occupied by the drainage channels being at the most 15% of the contact area, the radial depth of the drainage channels being 0.03 mm to 0.2 mm and 2% to 5% of the radial thickness of the plain bearing liner, this radial thickness being at least equal to 4 mm; and
    means for withdrawing lubricant from the channels and thereby maintaining the contact area substantially dry.

2. The slider bearing assembly defined in claim 1 wherein the channels extend continuously between the end faces.

3. The slider bearing assembly defined in claim 1 wherein the channels are axially open only at the end faces and the middle region is smooth and unchanneled.

4. The slider bearing assembly defined in claim 1 wherein the channels extend obliquely nonparallel to the axis.

5. The slider bearing assembly defined in claim 1 wherein the channels are arcuate.

6. The slider bearing assembly defined in claim 1 wherein the channels are straight and parallel to the axis.

7. The slider bearing assembly defined in claim 1 wherein the channels extend obliquely between the end faces but some of the channels are inclined oppositely to the remainder of the channels to cross and intersect same.

8. The slider bearing assembly defined in claim 1 wherein one of the bore and outer surfaces is formed with such channels that extend obliquely all generally parallel to one another and the other of the bore and outer surfaces is also formed with such channels that also extend obliquely all generally parallel to one another but opposite to the channels of the one surface, whereby the channels of the one surface cross those of the other.

9. The slider bearing assembly defined in claim 1 wherein the channels flare axially toward the end faces.

10. The slider bearing assembly defined in claim 9 wherein the channels are of constant radial depth and flare only angularly.

* * * * *